United States Patent [19]
Brachert et al.

[11] Patent Number: 5,790,970
[45] Date of Patent: Aug. 4, 1998

[54] VEHICLE DYNAMICS CONTROL SYSTEM WITH VARYING SENSOR CONFIGURATIONS

[75] Inventors: Jost Brachert, Ditzingen; Elmar Mueller, Markgroeningen, both of Germany; Ralf Hadeler, Farmington Hills, Mich.; Frank Leibeling, Moeglingen, Germany; Juergen Schuh, Markgroeningen, Germany; Michael Schubert, Althengstett, Germany

[73] Assignee: Robert Bosch GmbH, Stuttgart, Germany

[21] Appl. No.: 576,961

[22] Filed: Dec. 22, 1995

[30] Foreign Application Priority Data

Dec. 24, 1994 [DE] Germany ............... 44 46 534.3

[51] Int. Cl.$^6$ ................................ B60T 8/00
[52] U.S. Cl. ................ 701/70; 303/146; 701/74
[58] Field of Search ............. 364/426.01, 426.015, 364/426.016, 426.017, 426.018, 426.019, 426.021, 426.023, 426.225; 303/146, 147, 148, 149, 150; 701/70, 71, 72, 73, 74, 75, 76, 78, 80

[56] References Cited

U.S. PATENT DOCUMENTS

| | | | |
|---|---|---|---|
| 4,794,539 | 12/1988 | Wallentowitz et al. | 364/426.1 |
| 4,898,431 | 2/1990 | Karnopp et al. | 303/100 |
| 4,998,593 | 3/1991 | Karnopp et al. | 180/140 |
| 5,079,708 | 1/1992 | Brown | 364/426.016 |
| 5,134,352 | 7/1992 | Matsumoto et al. | 364/426.016 X |
| 5,207,483 | 5/1993 | Shimada et al. | 303/100 |
| 5,255,194 | 10/1993 | Schuafelberger et al. | 364/426.02 |
| 5,275,474 | 1/1994 | Chin et al. | 303/148 |
| 5,311,431 | 5/1994 | Cao et al. | 364/424.05 |
| 5,328,256 | 7/1994 | Ohta et al. | 303/146 |
| 5,332,300 | 7/1994 | Hartmann et al. | 303/146 |
| 5,371,677 | 12/1994 | Ehret et al. | 364/426.016 |
| 5,455,770 | 10/1995 | Hadeler et al. | 364/426.01 |
| 5,576,959 | 11/1996 | Hrovat et al. | 303/148 X |

FOREIGN PATENT DOCUMENTS

| | | |
|---|---|---|
| 0392164 | 10/1990 | European Pat. Off. . |
| 4221030 | 1/1994 | Germany . |
| 4222958 | 1/1994 | Germany . |
| 2258198 | 2/1993 | United Kingdom . |

OTHER PUBLICATIONS

Automotive Handbook, 3rd edition (1993) pp. 610–619, 639–643.

Primary Examiner—Michael Zanelli
Assistant Examiner—Edward Pipala
Attorney, Agent, or Firm—Felfe & Lynch

[57] ABSTRACT

A movement variable which represents the movement of a vehicle is controlled by actuating at least one actuator for applying a braking force to the wheels. Controller means use controller internal variables to form signals for influencing the actuators with the effect of adjusting a control variable. The controller means has a first area adapted to the respective selected sensor configuration in such a way that the controller-internal variables are formed on the basis of the sensor signals, and a second area for processing the controller-internal variables independently of the selection of the sensor configuration. As a result, simple adaptation with low development and application outlay to a wide variety of sensor configurations is possible.

12 Claims, 7 Drawing Sheets

VEHICLE DYNAMICS CONTROL SYSTEM WITH VARYING SENSOR CONFIGURATIONS

PRIOR ART

Systems for controlling the dynamics of motor vehicles are known from the prior art in many different kinds of modifications. Here, desired variables are generally determined from measured variables and estimated variables and their adjustment, using individually settable braking torques at the wheel brakes, contributes to stabilizing the handling characteristics. Here, the speed of the wheels, the yaw speed and the steering angle of the vehicle are generally used as measured variable.

U.S. Pat. No. 5,455,770 discloses a modular vehicle dynamics control system which is organized hierarchically and is divided into a vehicle dynamics computer with the subordinate brake control modules and, in a further refinement, a rear-axle steering system. The wheel controller and hydraulic rear-axle steering actuator systems are subordinated to these modules. Above all the untrained driver is supported in critical driving situations by means of such vehicle dynamics control systems. The vehicle is stabilized even in extreme situations and braking can be carried out automatically in critical situations, that is to say without the driver operating the brake pedal. The yaw speed, that is to say the movement of the vehicle about the vertical axis of the vehicle, is controlled. If a low coefficient of friction of the roadway is detected, the desired value for the yaw speed is briefly reduced. If the control difference is high, an active braking intervention takes place.

In the subject-matter of the German Offenlegungs-schrift 42 22 958, four vehicle-dynamic situations in which a vehicle may instantaneously find itself, namely braking with a split coefficient of friction, cornering, changing lane and traveling straight ahead, are detected. The following four measurement signals: front-wheel steering angle, vehicle speed, left-hand and right-hand front-wheel braking pressure are present for the detection of these four travel situations. Various variables from which reference points for distinguishing the abovementioned situations are obtained are derived from these four measurement signals. Depending on the travel situation which has been detected, different independent control strategies are selected by various controllers.

Likewise, the German Offenlegungsschrift 42 21 030 discloses a method for detecting the travel situation in a vehicle in which the current travel situation is detected online by evaluating the smallest possible number of measurement signals available in the vehicle. This takes place by using fuzzy logic. Here too, independent control strategies are adapted to the situation by means of various controllers depending on the situation which has been detected (cornering with braking, µsplit).

U.S. Pat. No. 5,311,431 discloses a method for acquiring the yaw speed and/or lateral speed.

For this purpose, the steering angle of the vehicle and the lateral acceleration are measured.

Methods for skidding detection within a vehicle dynamics control system are known for example from the U.S. Pat. No. 5,265,194 and the German Offenlegungsschrift 42 19 750.

Conventional anti-lock brake systems for passenger cars or utility vehicles are known for example from "Automotive Handbook", Third edition, 1993, pp. 610 to 619 and pp. 639 to 643. Different systems for controlling and adjusting the drive train of a motor vehicle are also known from this prior art (pp 536 to 559). These include, for example, known traction control systems and gear box control systems.

The object of the present invention consists in designing a vehicle dynamics control system which can be adapted to an extremely wide variety of vehicles in a flexible way.

SUMMARY OF THE INVENTION

In the vehicle dynamics control system according to the invention a movement variable which represents the movement of a vehicle is controlled. For this purpose, at least actuators for applying a braking force to the wheels are actuated. Controller means are provided by means of which signals for influencing the actuators with the effect of controlling a control variable are formed using controller-internal variables. The controller-internal variables can be detected here as a function of sensor signals from various, selectable sensor configurations.

The core of the invention consists in the fact that the controller means have two areas, the first area being adapted to the respective selected sensor configuration in such a way that the controller-internal variables are formed on the basis of the sensor signals. The sensor area for processing the controller-internal variables is configured independently of the selection of the sensor configuration.

Owing to the division into a sensor configuration-independent component and a sensor configuration-dependent component, simple adaptation with low development and application outlay to an extremely wide variety of vehicles is made possible. If the controller structure according to the invention is to be adapted to vehicles with different sensor configurations, only the sensor configuration-dependent area of the controller has to be changed while the sensor configuration-independent component, the core of the controller, can remain unchanged.

In one advantageous embodiment there is provision for means for detecting the steering movements of the vehicle and means for detecting the yawing movement to be selected as a first sensor configuration, means for detecting the steering movements of the vehicle and means for detecting the lateral movement at one point on the vehicle to be selected as a second sensor configuration, means for detecting the steering movements of the vehicle and means for detecting the yawing movement and means for detecting the lateral movement at one point on the vehicle to be selected as a third sensor configuration, or means for detecting the steering movements of the vehicle and means for detecting the lateral movements at at least two points on the vehicle to be selected as a fourth sensor configuration.

In particular, there may be provision for the means for detecting the steering movements to be configured as a steering angle sensor, the means for detecting the yawing movements to be configured as a yaw angle speed sensor, the means for detecting the lateral movements to be configured as acceleration sensors appropriately mounted on the vehicle.

The first sensor configuration-dependent area is advantageously configured in such a way that a variable which represents the yawing movement or the lateral movement of the vehicle is determined as a control variable on the basis of the sensor signals and independently of the selected sensor configuration. In one advantageous embodiment of the invention there is provision for the controller means to be of modular design and to have at least two submodules.

A reference variable is determined in a first submodule as a function of at least the detected variable which represents the lateral movement or the yawing movement of the vehicle, in order to adjust the control variable, and The control variable is formed in a second submodule and compared with the determined reference variable in order to form the signals for influencing the actuation signals of the actuators.

There may be provision for the controller means also to have a third submodule by means of which a variable which represents the current driving situation status is identified as a function of at least the detected rotational movements of the wheels or the variable which represents the lateral movement or the yawing movement of the vehicle and this variable is fed to at least one of the first or second submodules.

Advantageously, there is provision for the submodules themselves to consist of first areas which are adapted to the respective selected sensor configuration and second areas which are configured independently of the selection of the sensor configuration.

Further advantageous embodiments of the invention can be found in the subclaims.

DETAILED DESCRIPTION OF THE PREFERRED EMBODIMENT

Figure 1:
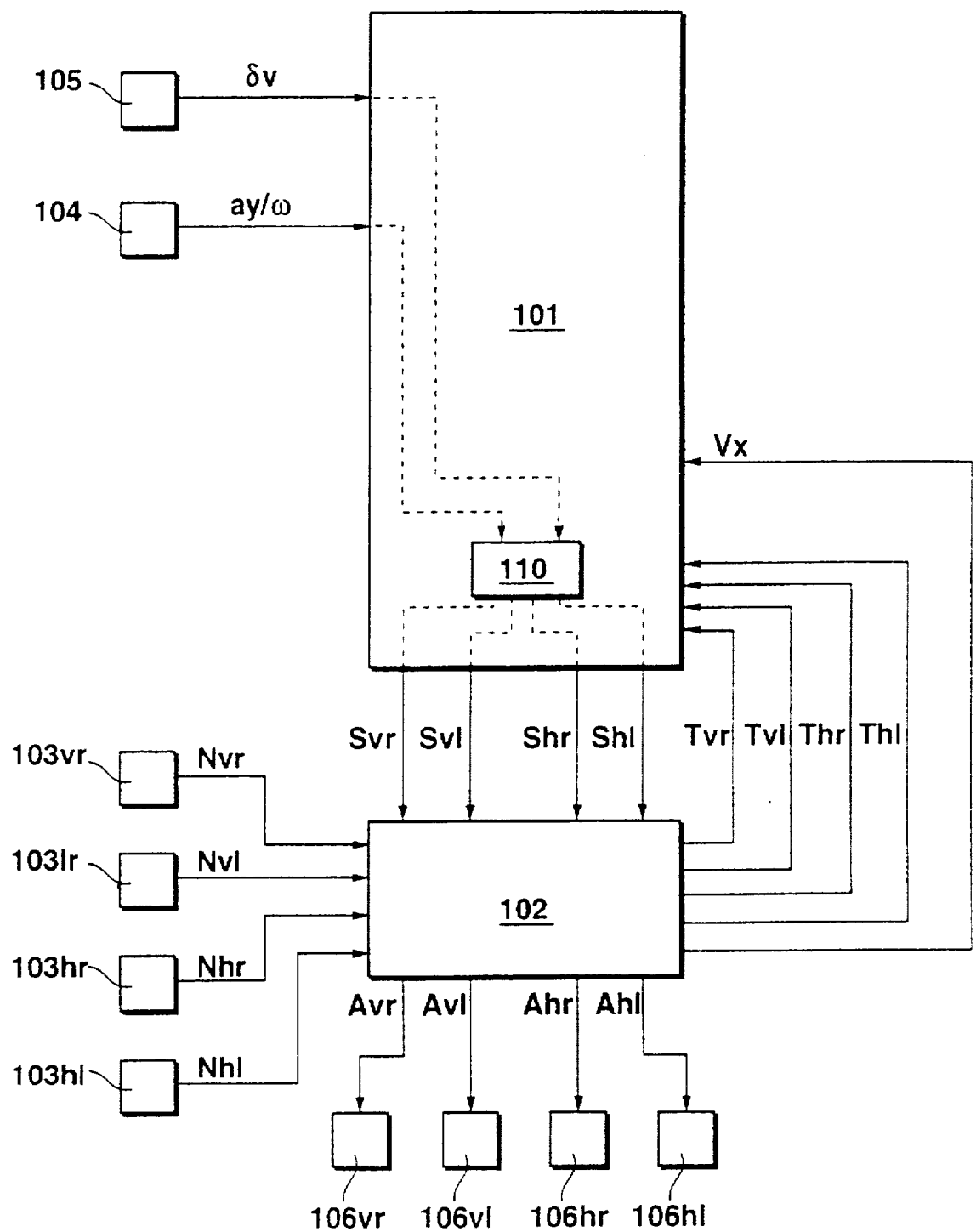
FIG. 1 is a diagram of the overall system.

FIG. 1 shows a first controller component 102 and a second controller component 101. Signals $\delta_v$ of a steering angle sensor 105 are fed to the second controller component. Furthermore, signals from a sensor 104 are fed to the second controller 101. The sensor 104 can sense, as a lateral acceleration sensor, the lateral acceleration $a_y$ of the vehicle at a specific location of the vehicle and/or as yaw speed sensor or two lateral acceleration sensors the yaw angle speed ω, that is to say the angular speed about the vertical axis of the vehicle. Furthermore, the longitudinal speed Vx of the vehicle and the signals Tij are fed to the second controller means 101. The signals Tij represent here the actuation times of the actuators 106ij to be described later. The index i indicates whether the respective variable, the respective actuator or the respective sensor is located at the rear axle (h) or front axle (v). The index j indicates the assignment to the right-hand (r) or left-hand side (l) of the vehicle.

The first controller means 102 which are generally configured in this embodiment as an anti-lock brake system process the signals Nij of wheel speed sensors 103ij. Variables which represent the wheel slip and/or the wheel deceleration are formed as a function of the wheel speeds in the first controller means 102. In order to adjust or control these variables, the wheel brakes 106ij are actuated by the actuation signals Aij. The signals Tij already mentioned indicate the actuation times of the individual wheel brakes. These actuation times Tij and the longitudinal speed Vx of the vehicle are formed in the first controller component 102 and, as already mentioned, are fed to the second controller means 101. Instead of the actuation time signals Tij, the braking pressures at the individual wheel brakes can also be measured. However, this requires an extended sensor system.

Furthermore, in FIG. 1, a monitoring unit 110 which monitors the input signals of the sensors 104 and 105 and, if appropriate, can act on the output signals Sij of the second controller component 101 is depicted within the second controller component 101.

The functioning of the first controller component 102, or of the first module, will not be described here in greater detail since it is an anti-lock brake system which is known sufficiently from the prior art. In this respect, the relevant prior art which is mentioned for example in the introduction to the description can be referred to. The longitudinal speed Vx of the vehicle is also formed from the wheel speeds Nij in a known manner. For this purpose, for example the speeds Nij of the wheels can be logically connected in a weighted manner. With regard to the present invention, all that needs to be mentioned is that the wheel brakes 106ij are actuated as a function of the wheel speeds Nij by means of the first controller component with the effect of controlling the wheel slip and/or the wheel deceleration. The second controller component 101 intervenes in these actuations, when required, by means of the output signals Sij. For the purpose of further explanation we will now proceed to FIG. 2.

Figure 2:
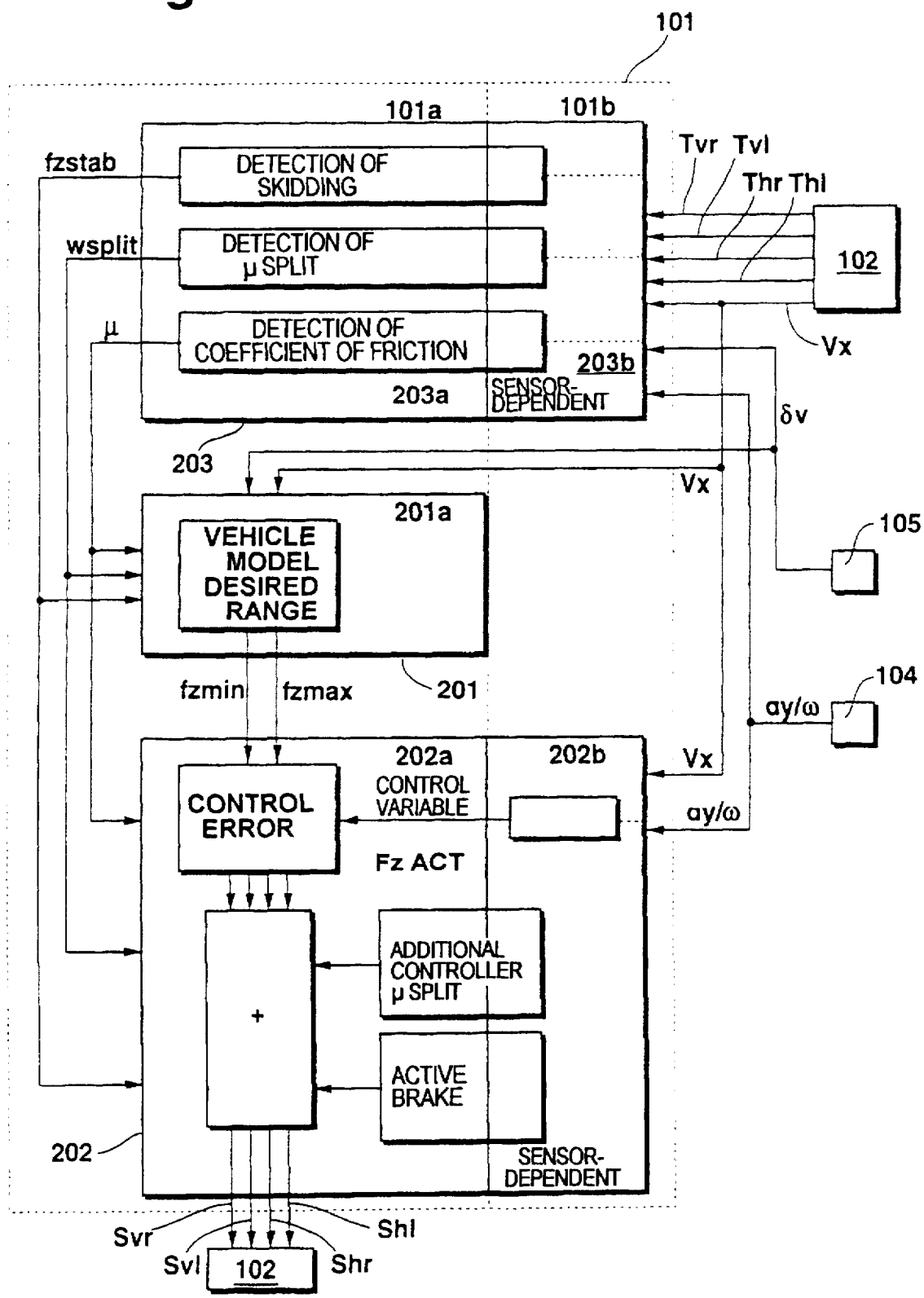
FIG. 2 is a diagram of the second (superordinate) controller including the first, second and third submodules.
Figure 5:
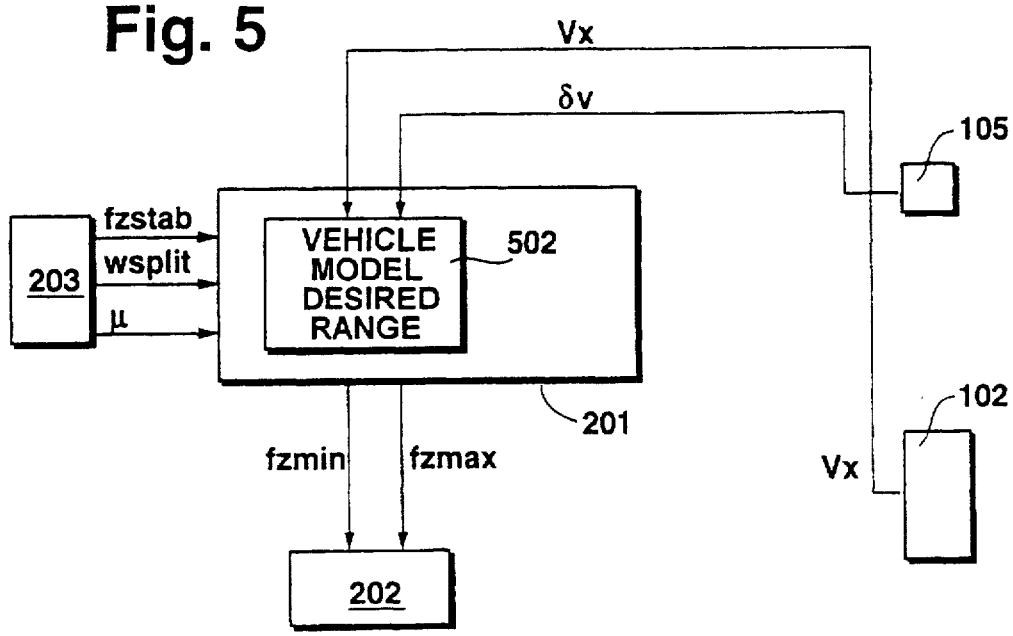
FIG. 5 is a detailed diagram of the inputs of the first submodule.
Figure 6:
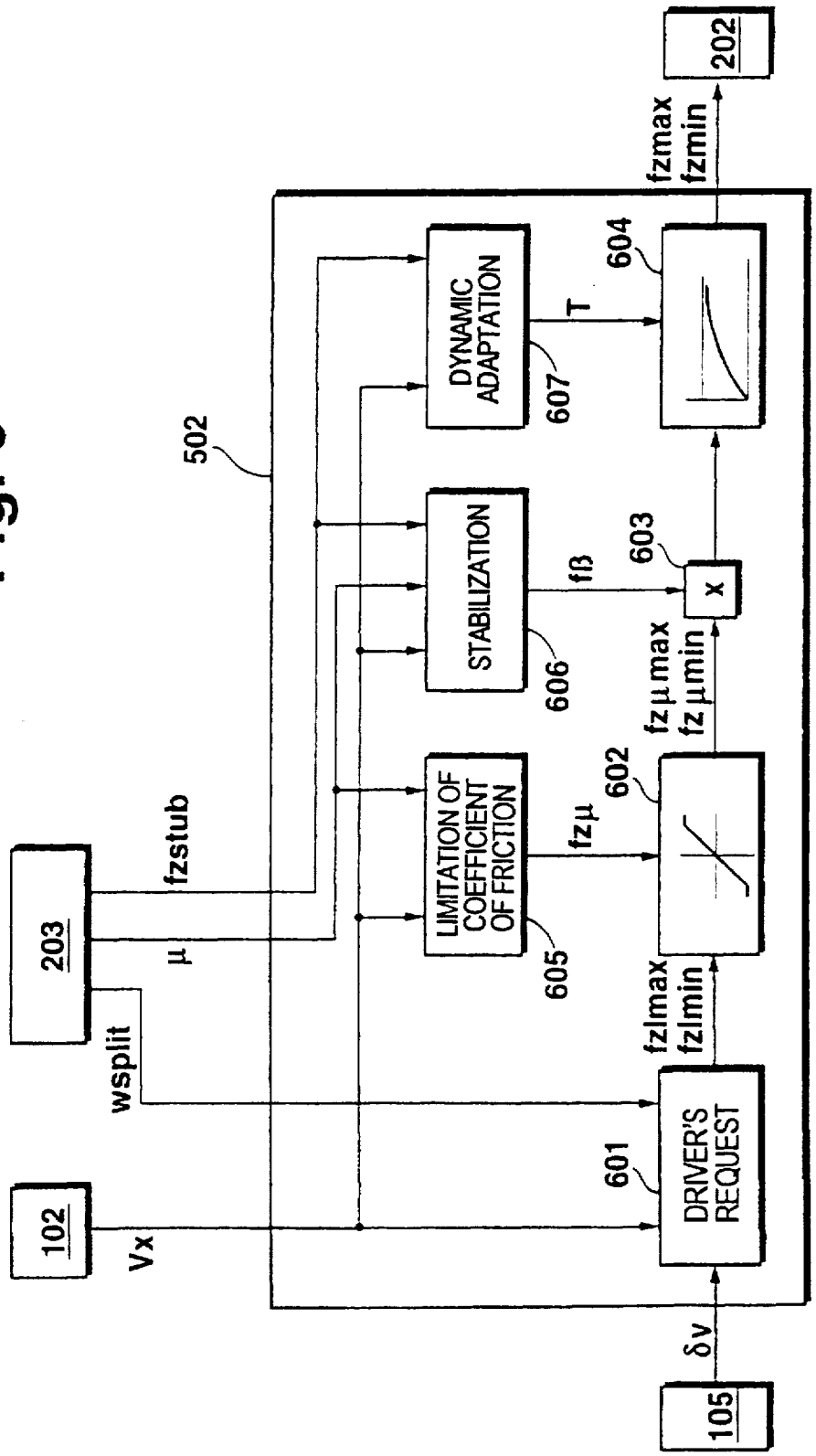
FIG. 6 is a detailed diagram of the functions of the first submodule.

FIG. 2 shows in more detail the second controller component, or the second module 101. Here, the division of the module 101 into a first submodule 201, a second submodule 202 and a third submodule 203 can be seen. The longitudinal speed Vx of the vehicle is fed from the first controller component 102 to the first submodule 201 as are the steering angle $\delta_v$ of the sensor 105 and optionally the lateral acceleration $a_y$ of the vehicle and/or the yaw angle speed ω of the sensor or sensors 104. Furthermore, the output signals $fz_{stab}$, $W_{split}$ and μ of the third submodule 203 to be described later are supplied to the first submodule 201. A desired range for the reference variables or control variables which is characterized by the limits $fz_{min}$ and $fz_{max}$ is formed in the first submodule 201 as a function of the input signals. FIGS. 5 and 6 should be referred to for the more precise functioning of the first submodule 201. In summary, it is possible to say at this point that the reference variable or a desired range of control variables is formed by means of the first submodule 201 for the purpose of controlling according to the invention.

The longitudinal speed of the vehicle (output signal of the first controller component 102) and the lateral acceleration $a_y$ of the vehicle and/or the yaw angle speed ω (output signal of the sensor 104) are supplied to the second submodule 202. Furthermore, the output signals, which have already been mentioned, of the third submodule 203 which is still to be described are present at the second submodule 202. The second submodule will be described more precisely with reference to FIG. 3, but it is possible to say in summary at this point that a control variable $fz_{act}$ is formed here as a function of the detected dynamics of the vehicle. This control variable is compared with the reference variable formed in the first submodule 201 or the desired range ($fz_{min}$, $fz_{max}$) of control variables, the signals Sij being formed in order to influence the wheel brakes 106ij with the effect of approximating the control variable to the corresponding reference variable or with the effect that the control variable remains in the desired range of control variables. The second submodule 202 therefore constitutes the actual core of the second controller.

The brake actuation times Tij, already mentioned, are fed from the first controller component 102 to the third submodule 203, as are the longitudinal speed Vx of the vehicle, the steering angle $\delta_v$, and the lateral acceleration $a_y$ of the vehicle or the yaw angle speed $\omega$. By means of the third submodule 203, output variables $fz_{stab}$, $W_{split}$ and $\mu$ are formed which describe the current travel situation or environmental influences to which the vehicle is subjected. For the more precise functioning of the third submodule 203, FIG. 4 will be referred to.

In summary, FIG. 2 shows a modular design of the second controller component 101.

Figure 3:
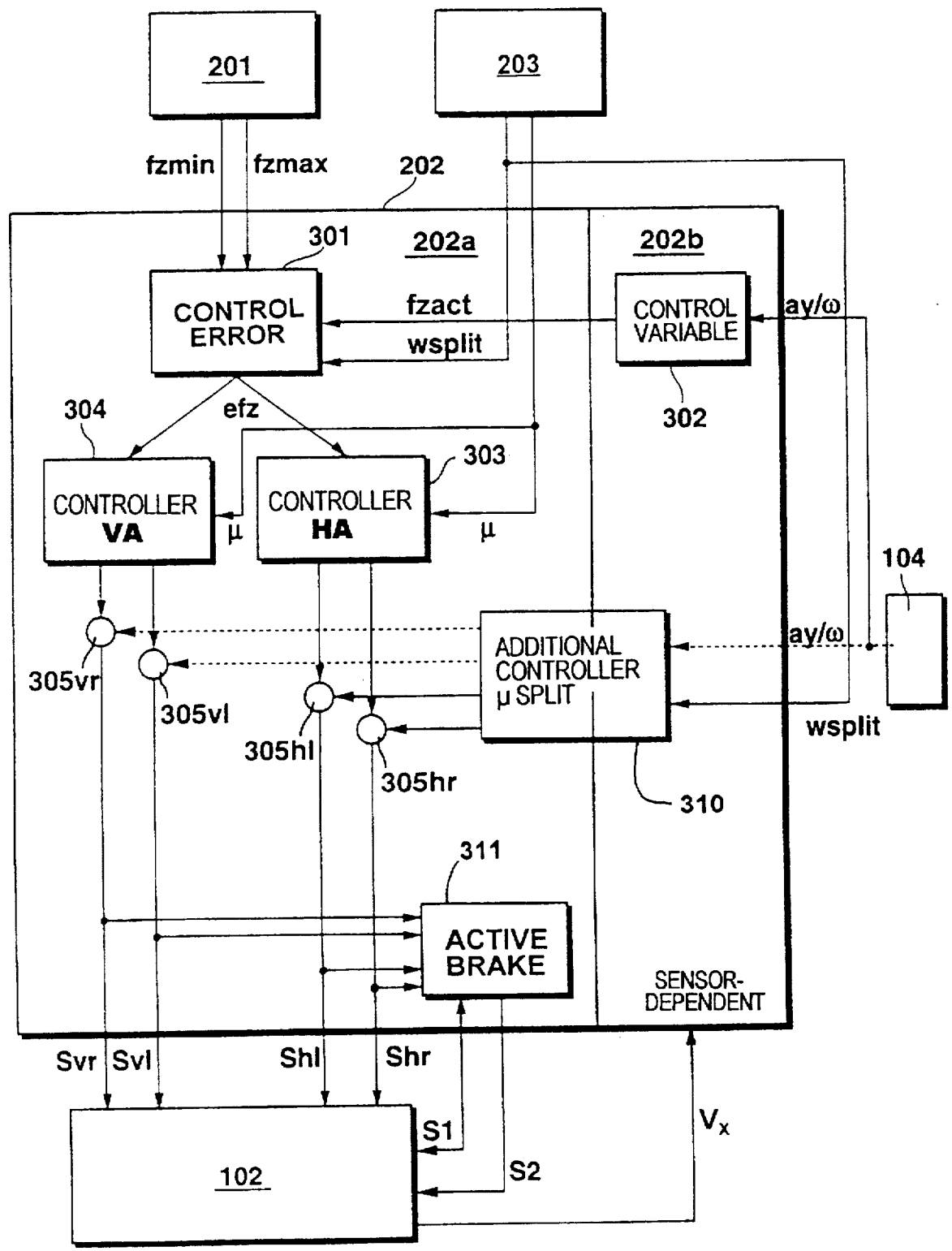
FIG. 3 is a detailed diagram of the second submodule.

FIG. 3 shows the more precise functioning of the second submodule 202. In the unit 302, a control variable $fz_{act}$ is formed here as a function of the longitudinal speed Vx of the vehicle, as a function of the lateral acceleration $a_y$ of the vehicle and/or as a function of the yaw angle speed $\omega$. This takes place in that a vehicle model (or a simple calculation rule which is based on the geometry of the vehicle) is stored in the unit 302. An instantaneous value $fz_{act}$ of the control variable can be identified in a known manner by means of a vehicle model as a function of the detected longitudinal speed of the vehicle, lateral acceleration of the vehicle and yaw speed variables which represent the instantaneous dynamics of the vehicle. This control variable is supplied to the unit 301 in order to determine the control error. Furthermore, the limits $fz_{min}$ and $fz_{max}$ of the desired range of control variables is present at the unit 301. In addition, the variable $W_{split}$ (output variable of the third submodule 203) is also supplied to the unit 301. In the unit 301, the control variable $fz_{act}$ is now compared with the desired range of control variables which is determined by the limits $fz_{min}$ and $fz_{max}$. If the control variable $fz_{act}$ is not within the desired range of control variables, a corresponding control error signal $e_{fx}$ is present at the output side of the unit 301. The signal $W_{split}$ of the third submodule 203 can be additionally used during the formation of the control error signal $E_{fx}$. As is still to be described with reference to FIG. 4, this signal indicates whether the vehicle is in a so-called $\mu$ split situation, that is to say whether the coefficients of friction of the roadway on the right-hand and left-hand sides of the vehicle differ to a certain degree. The control error signal $E_{fx}$ is fed on the one is, hand to the controller HA for the rear axle 303 and to the controller VA for the front axle 304. Here, signals for actuating the wheel brakes at the rear axle or front axle are formed from the control error $E_{fx}$ taking into account the determined coefficient of friction $\mu$. Depending on whether the vehicle is oversteered or understeered, individual wheels are therefore overbraked or underbraked. In this way, the control variable $fx_{act}$ is returned to the desired range of control variables. The actuation signals for the wheel brakes can be modified by the additional controller 310. Such modifications by the additional controller 310 are used in particular if the $\mu$ split conditions already described are detected by the third submodule 203, that is to say that it is detected whether the coefficients of friction of the roadway on the right-hand and left-hand sides of the vehicle are extremely different. For this purpose, the corresponding signal $W_{split}$ of the third submodule 203 is fed in the additional controller 310. A signal which represents the lateral acceleration $a_y$ and/or the yaw angle speed $\omega$ can be optionally supplied to the additional controller 310. The rear wheel which is moving on the roadway with the higher coefficient of friction is selectively underbraked by the additional controller 310. If appropriate, as indicated with the broken line, an additional intervention at the front-axle brakes may be provided.

Braking interventions can also be realized by means of the additional active brake controller 311 although the driver of the vehicle does not activate the brake pedal. Without the additional active brake controller 311, the actuation signals Aij from the first controller component 102 for the wheel brakes are modified only by the output signals Sij of the second submodule 202 or of the second controller component 101. This takes place in that a braking pressure which is applied by the first controller component 102 is either increased or decreased at a wheel by means of the signals Sij. If the driver of the vehicle does not wish to perform a braking process (no activation of the brake pedal), generally no braking pressure is built up by the anti-lock brake system 102. If overbraking or underbraking of a wheel by means of the second controller component 101 or by means of the described controller errors in the second submodule 202 is desired in order to maintain the handling stability, in this case this cannot take place by modifying the actuation signals Aij of the anti-lock brake system 102. By means of the signal SI, the anti-lock brake system 102 reports to the additional controller 311 that the driver is not making a request for braking and thus corresponding pressure is not built up. If it is established, by the additional controller 311 tapping the signals Sij, that individual wheel brakes are to be activated, the corresponding braking pressure is made available to the anti-lock brake system 102 by means of the signal S2 from the additional controller 311. For example, a front wheel can be selectively overbraked by means of the additional active brake controller 311 even though the driver does not activate the brake pedal. Of course, further wheels can be additionally braked if necessary.

Figure 4:
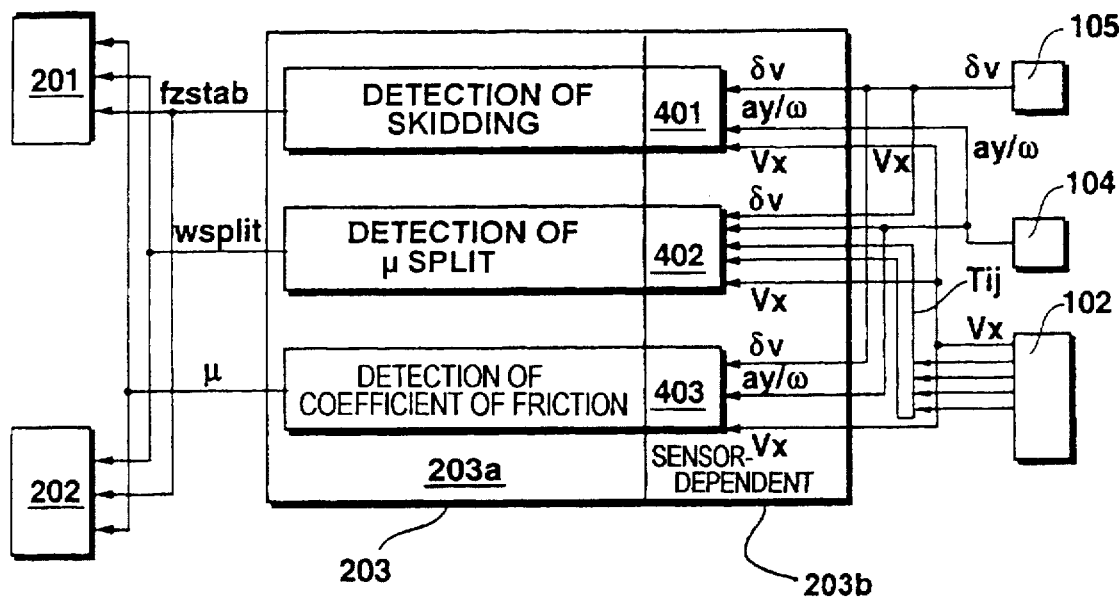
FIG. 4 is a detailed diagram of the third submodule.

The mode of operation of the third submodule 203 will be described with reference to FIG. 4. This sub-module consists of a device for detecting skidding 401, a $\mu$ split detection device 402 and a device 403 for detecting the coefficient of friction.

The steering angle signals $\delta_v$ (sensor 105), the lateral acceleration $a_y$ and/or the yaw angle speed $\omega$ (sensor 104) and the longitudinal speed Vx of the vehicle are fed to the device 401 for detecting skidding. The measured vehicle-dynamic data are compared with a reference model of the vehicle in a known manner in the device 401 for detecting skidding. This reference model indicates at which vehicle-dynamic data the vehicle can still be controlled or is still stable. As a function of this comparison, the variable $fz_{stab}$ is formed as an output variable of the device 401 for detecting skidding. This variable can either assume two or more discrete values or continuously indicate to what extent the vehicle is still stable.

In the device 402 for detecting $\mu$ split, the $w_{split}$ variable is acquired on the basis of signals of the steering angle sensor, the sensor for the lateral acceleration of the vehicle and/or the sensor for the yaw speed, the actuation time Tij of the individual wheel brakes and the vehicle speed Vx. This variable $w_{split}$ indicates whether the coefficients of friction of the roadway on the right-hand and left-hand sides of the vehicle differ. The pressure differences between the individual wheel brakes can be calculated from the valve actuation times Tij which can be obtained from the anti-lock brake system 102. If these braking pressure are compared with the instantaneous steering angle and the instantaneous lateral acceleration (or optionally the instantaneous yaw angle speed), a measure is obtained of the extent to which the coefficients of friction of the roadway on the right-hand side and on the left-hand side of the vehicle differ. Of course, instead of the valve actuation times Tij the braking pressures of the individual wheel brakes can also be detected directly, which however requires an extended sensor system. The output signal $W_{split}$ of the device 402 for detecting μ split can either be configured to be digital (μ split condition yes or no), a multi-level signal or a continuous signal.

The signals of the steering angle, the lateral acceleration of the vehicle and/or the yaw angle speed and the longitudinal speed of the vehicle are fed to the device 403 for detecting the coefficient of friction. A comparison with a reference model of the vehicle also takes place in the device 403 for detecting the coefficient of friction, a coefficient of friction signal μ also being present on the output side as the result of the comparison.

By means of the described device 203 for detecting the situation (third submodule), the entire controller component 101 can therefore be adapted very precisely to the respective travel situation, and to the currently present environmental situation to which the vehicle is subjected.

FIG. 5 shows the more precise mode of operation of the first submodule 201. In particular the steering angle $\Delta_v$ and the longitudinal speed Vx of the vehicle are fed to a unit 502. A reference variable ($fz_{des}$ and the limits $fz_{min}$, $fz_{max}$) is formed by means of a vehicle model. One particular feature of this part of the exemplary embodiment consists in the fact that the desired range of control variables already mentioned is calculated. This can take place as a function of the output signals of the third submodule 203, as well as as a function of the steering angle $\delta_v$, and the longitudinal speed Vx of the vehicle. In this regard, a more precise description will be given with reference to FIG. 6.

In the unit 601 of FIG. 6, a first,upper limit $fz_{lmax}$ and a lower limit $fz_{lmin}$ are determined as a function of the detected steering angle $\delta_v$, the longitudinal speed Vx of the vehicle and the output signal $\delta_v$, of the device for detecting μ split (third submodule 203). Therefore, a desired range for a roadway with a high coefficient of friction is initially derived from the steering movement of the driver by means of the unit 601 using a vehicle model. This first desired range is corrected by means of adaptation of the coefficient of friction (605 and 602) in order to prevent the vehicle skidding on a smooth roadway. For this purpose, the longitudinal speed Vx of the vehicle and the coefficient μ of friction of the roadway determined in the third submodule 203 are fed to the coefficient of friction limiter 605. The variable $fz_μ$ which corrects the limits identified in the unit 601 is identified from these. These corrected limits are designated in FIG. 6 by $fz_{μmax}$ and $fz_{μmin}$.

If, nevertheless, a tendency to skid occurs, the desired range undergoes a further adaptation (606, 603) in order to stabilize the vehicle. For this purpose, the longitudinal speed Vx of the vehicle, the identified coefficient μ of friction of the roadway and the stability variable $fz_{stab}$ are fed to the stabilizing device 606. In order to correct the limits, the variable $f_β$ is formed on the output side of the stabilizing device 606 and included multiplicatively in the logic connection 603 during the limit formation.

The steady-state desired range determined in this way (output of the multiplication stage 603) is finally provided with desired dynamics by means of the unit 607 or 604. For this purpose, the longitudinal speed Vx of the vehicle and the stability variable $fz_{stab}$ (output signal of the third submodule 203) are fed to the dynamic adaptation device 607. The dynamic signal T with which the steady-state desired range is made dynamic by means of the unit 604 is then located on the output side of the unit 607. This desired range which has been made dynamic then has the limits $fz_{max}$ and $fz_{min}$ already mentioned.

The individual calculation steps of the respectively present travel situation (μ split, skidding, unbraked, fully braked vehicle) are adapted in the unit 502. In addition, the fuzzy logic method can be applied in each calculation step.

In summary, it is true of the determination 502 of the desired range of control variables that instead of an unambiguous desired value $fz_{des}$, a desired range ($fz_{min}$, $fz_{max}$) for the vehicle movement variable fz is prescribed, which desired range ($fz_{min}$, $fz_{max}$) indicates the maximum permitted lateral dynamics and the minimum required lateral dynamics of the vehicle. The upper limit $fz_{max}$ of the desired range describes a vehicle behavior which in terms of dynamics and absolute size is slightly greater than the natural movement of the vehicle and indicates the stability limit. The lower limit $fz_{min}$ indicates the minimum vehicle reaction to steering movements which is required under unfavorable conditions (below the natural vehicle movement). As a result of the separate specification of the range limits, calculation which is adapted to problems is possible, for example the use of different vehicle models and dynamics for the upper limit (stability) and lower limit (steerability). The second or superordinate controller component 101 must not intervene until the vehicle movement variable fz leaves the acceptable range, described by the desired band.

As a result, unnecessary interventions are avoided and in the case of full braking the subordinate ABS 102 can control undisturbed over relatively long phases. In particular, there may be provision for actuation not to occur until the control variable is outside the desired range. In order to ensure correctly timed intervention, actuation takes place whenever it is clear that the control variable is leaving, or will leave, the desired range. For this purpose, for example the behavior of the control variable fz over time can be evaluated.

Figure 7:
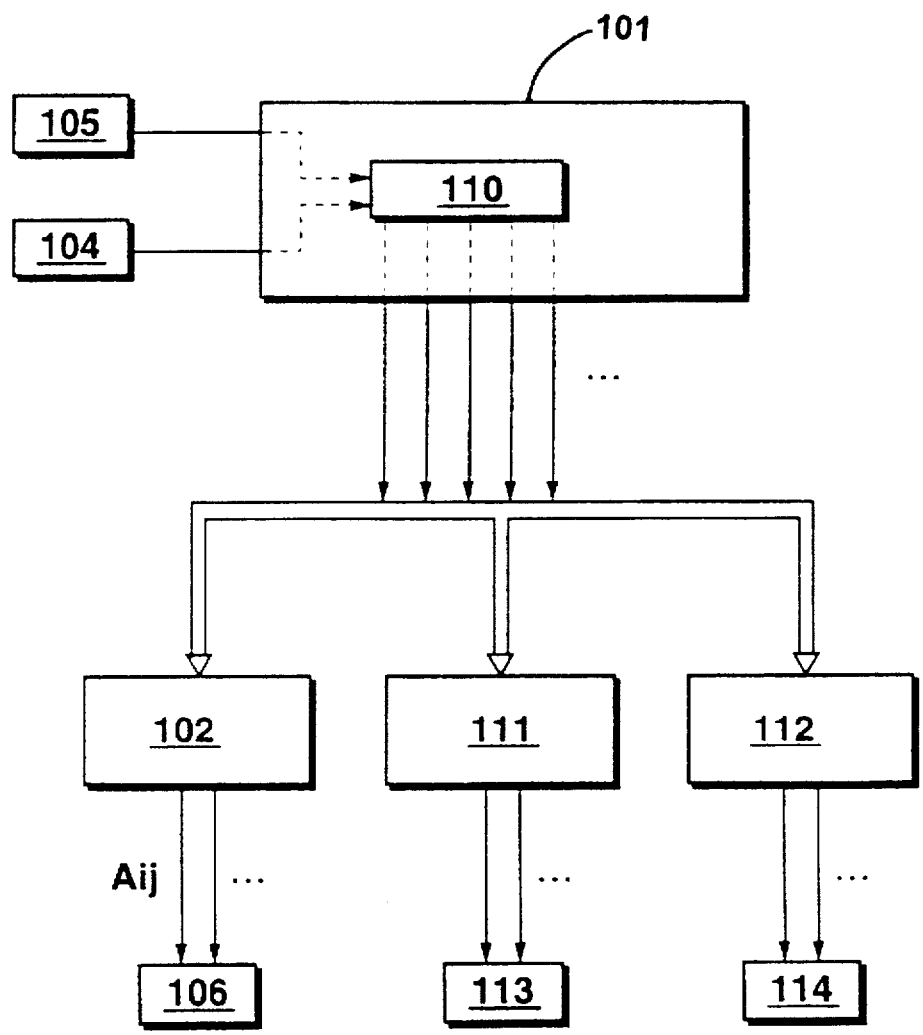
FIG. 7 is a diagram illustrating the cooperation between the superordinate controller and a plurality of subordinate controllers.

With reference to FIG. 7, the extension of the exemplary embodiment to further subsystems, in addition to the described anti-lock brake system 102, will be described. The second controller component 101 has already been described and supplies actuation signals for an extremely wide variety of actuators as a function of sensor signals in the described manner. In the previously described exemplary embodiment, the modification of braking signals within the scope of an anti-lock brake system 102 was represented. However, according to the invention further subsystems can also be influenced by the second controller component 101. In this respect in particular a known traction control device 111 was being considered, by means of which traction control device 111 the wheel slip is controlled by forming actuation signals in order to actuate actuator elements for reducing the wheel drive torque. Furthermore, a gearbox control 112 is provided as a subsystem, by means of which gearbox control 112 the transmission ratio between the vehicle engine and the wheels is adjusted or controlled by forming actuation signals for actuating actuator elements. As a result, a modular vehicle dynamics control device is obtained which is "upwardly compatible" with existing standard controllers 102, 111 and 112. In this way, a hierarchically structured, modular vehicle dynamics control device with a superordinate controller 101 for the vehicle movement and subordinate controllers for braking processes 102 or drive train 111, 112 is obtained. In this context, the subordinate controllers 102, 111, 112 can be conventional standard controllers which only have to be additionally provided with one interface.

In particular there is provision for monitoring means 110 to monitor the correct functioning of the second controller component 101 and/or the sensor system 104, 105, in particular the sensor system whose signals are fed exclusively to the controller component 101. If an incorrect function of the controller component 101 and/or of the sensor system 104, 105 is established by the monitoring means 110, the output signals of the second controller component 101 are, in the simplest case, suppressed. The subordinate controllers 102, 111 and 112 then go into an emergency operating mode which corresponds to the stand-alone series state.

Figure 8:
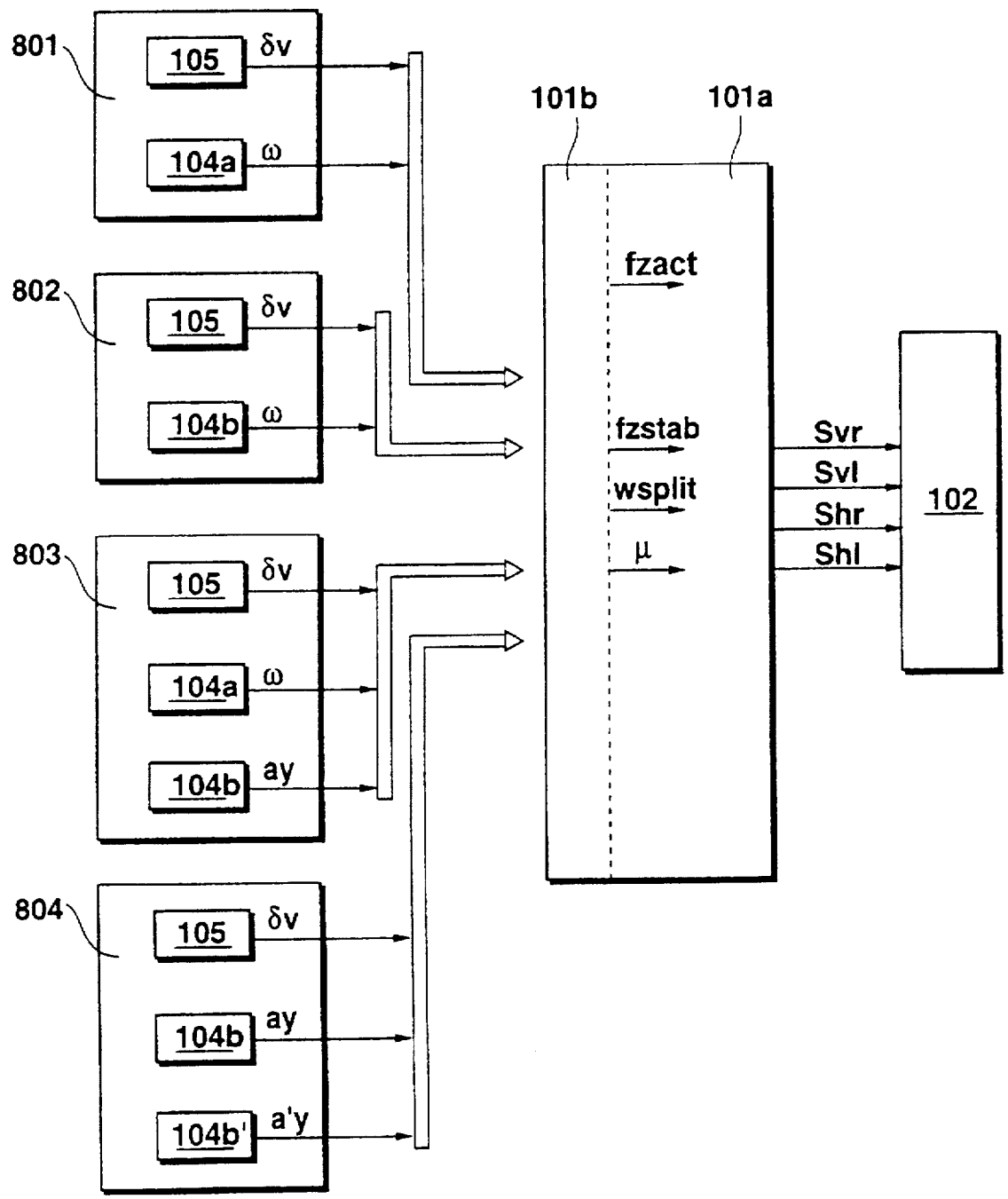
FIG. 8 is a diagram illustrating the different sensor configurations which can provide inputs to the superordinate controller.

A further special feature of the invention will now be referred to with respect to FIG. 8. The controller-internal variables which are used in the second controller means 101, that is to say the control variable $fz_{act}$ and the travel situation variables $fz_{stab}$, $W_{split}$ and $\mu$ are, as described, derived from data which are identified by sensors. However, these controller-internal variables can be detected with different sensor configurations. For this purpose, in FIG. 8 a steering angle sensor 105 and a yaw speed sensor 104a are shown as a first sensor configuration 801. A second sensor configuration for identifying the controller-internal variables is distinguished by the block 802 and consists in turn of the steering angle sensor 105 and the lateral acceleration sensor 104b. A third sensor configuration 803 consists again of the steering angle sensor 105, the yaw speed sensor 104a and the lateral acceleration sensor 104b. Furthermore, in FIG. 8, a steering angle sensor 105 and a plurality of lateral acceleration sensors 104b and 104b' are illustrated as a fourth sensor configuration, the lateral acceleration sensors 104b and 104b' being provided at various points on the vehicle. The described controller internal variables can be derived from the signals of all four sensor configurations. According to the invention, the second controller component 101 is divided into two areas, a first area being adapted to the respectively selected sensor configuration 801, 802, 803 or 804 while the second area 101a only processes the controller-internal variables which are independent of the sensor configuration, irrespective of the selection of the respective sensor configuration, and outputs the actuation signals Sij. For this purpose, the first area 101b is configured in such a way that the controller-internal variables are formed on the basis of the sensor signals of one sensor configuration.

The flexibility of the control system according to the invention is further increased by this division into a component 101a which is independent of the sensor configuration and a component 101b which is dependent on the sensor configuration. If the control according to the invention is adapted to a vehicle, all that is necessary is to adapt the component 101b to the respectively present sensor configuration while the controller component 101a can remain unchanged. As a result, a low degree of outlay on development and application is permitted.

In order to obtain more details on this part of the invention, FIGS. 2, 3, 4 and 5 will be referred to once more. The blocks already described in these figures are respectively divided into two areas with the identification a and the identification b. This corresponds respectively to the described component which is independent of the sensor configuration (identified with the letter a) and the component which is dependent on the sensor configuration (identified with the supplementary letter b). For example, the vehicle-dynamic modules for detecting situations, prescribing desired values and controlling the vehicle are split up into areas which are independent of the sensor configuration and areas which are dependent on the sensor configuration. The vehicle movement variable $fz_{act}$ or $fz_{des}$ which is always immediately normalized (for example to the lateral acceleration or yaw speed) is used in the areas 101a which are independent of the sensor configuration (for example vehicle model, core of the controller). These areas do not change when another sensor configuration is selected. Possible sensor configuration-dependent areas 101b are Calculation of the vehicle movement variable from the respective sensor variables (blocks 302 and 502).

Functions which are realized differently with different sensor configurations (for example device 401 for detecting skidding).

Sensor configuration-dependent improvement of the basic function (for example components of the additional controller 310).

In summary, the following is true of the exemplary embodiment presented:

The vehicle dynamics control system presented in the exemplary embodiment is based on the various stand-alone standard controllers (anti-lock brake system, traction control device, gearbox control device). For example in the case of an anti-lock brake system or a traction control device, the standard sensor system consists primarily of the wheel speed sensors. In the case of a gearbox control device, the engine speed and/or the input speed of the gearbox as well as the output speed at the gearbox and the engine load are generally also measured. In addition to this standard sensor system, the steering angle and the yaw speed and/or the lateral acceleration of the vehicle are detected using sensors. Further variables which are required are estimated on the basis of the existing sensor system. The main objective of the exemplary embodiment described consists in stabilizing the vehicle in critical travel situations. The improvement of the stabilization in critical travel situations is however in particular not only to be ensured in the case of severe braking maneuvers.

We claim:

1. A vehicle dynamics control system for controlling movement of a vehicle having wheels and brakes at said wheels, said system comprising:

selectable sensor means for producing sensor signals including a steering angle signal, and at least one signal selected from the group consisting of a first lateral acceleration signal, a second lateral acceleration signal, and a yaw velocity signal, controller means comprising a first controller area connected with the sensor means, said first controller area forming a plurality of controller internal variables as a function of said sensor signals dependent on which of said group of signals are produced by said sensor means, and a second controller area forming control signals as a function of said plurality of controller internal variables, said function being independent of which of said group of signals are produced by the sensor means, and means for applying a brake force at the wheels as a function of at least the control signals.

2. A vehicle dynamics control system as in claim 1 wherein said selectable sensor means comprises a steering angle sensor and a yaw speed sensor.

3. A vehicle dynamics control system as in claim 1 wherein said selectable sensor means comprises a steering angle sensor.

4. A vehicle dynamics control system as in claim 1 wherein said selectable sensor means comprises a steering angle sensor, a yaw speed sensor, and a lateral acceleration sensor.

5. A vehicle dynamics control system as in claim 1 wherein said selectable sensor means comprises a steering angle sensor and a pair of lateral acceleration sensors at different points on the vehicle.

6. A vehicle dynamics control system as in claim 1 wherein said first controller area forms one of said controller internal variables so as to represent one of lateral movement and yawing movement of the vehicle, independently of which of the group of signals are produced by the sensor means.

7. A vehicle dynamics control system as in claim 1 wherein said controller means comprises:

a first submodule which forms a desired range of one of the control variables, said range being defined by a minimum control variable and a maximum control variable each formed as a function of at least one of said first lateral acceleration and said yaw velocity and a second submodule which forms said one of the controller internal variables, compares it with the desired range of control variables, and forms said control signals based on said comparison.

8. A vehicle dynamics control system as in claim 7 further comprising means for detecting rotational movement of the wheels, said controller means further comprising:

a third submodule which forms one of the controller internal variables such that said controller variable represents a current travel situation of the vehicle, as a function of the rotational movements of the wheels and at least one of said lateral acceleration and said yaw velocity, and feeds said one of said controller internal variables to at least one of said first and second submodules.

9. A vehicle dynamics control system as in claim 8 wherein each submodule has a portion in said first controller area and a portion in said second controller area.

10. A vehicle dynamics control system as in claim 1 wherein said means for applying a brake force at the individual wheels comprises brake actuators at the individual wheels.

11. A vehicle dynamics control system as in claim 1 wherein said means for applying a brake force at the individual wheels comprises means for reducing wheel drive torque produced by the engine.

12. A vehicle dynamics control system as in claim 1 wherein said means for applying a brake force at the individual wheels comprises means for adjusting the transmission ratio between the engine and the wheels.

* * * * *

UNITED STATES PATENT AND TRADEMARK OFFICE
CERTIFICATE OF CORRECTION

PATENT NO.       : 5,790,970
DATED            : August 4, 1998
INVENTOR(S)      : Brachert et al.

It is certified that error appears in the above-identified patent and that said Letters Patent are hereby corrected as shown below:

In column 5, line 54, change the phrase "on the one is hand" to - - on the one hand - -.
In column 6, line 31, change "SI" to - - S1 - -.

Signed and Sealed this

Twenty-seventh Day of June, 2000

Attest:

Q. TODD DICKINSON

Attesting Officer

Director of Patents and Trademarks